United States Patent Office 3,506,551
Patented Apr. 14, 1970

3,506,551
2,4,5-TRICHLOROPYRIMIDINE AND 2,4,5,6-TETRACHLOROPYRIMIDINE
Gunter Beck and Hans Holtschmidt, Leverkusen, Germany, assignors to Farbenfabriken Bayer Aktiengesellschaft, Leverkusen, Germany, a corporation of Germany
No Drawing. Filed Oct. 31, 1967, Ser. No. 679,553
Claims priority, application Germany, June 8, 1967, F 52,633
Int. Cl. B01j 1/10; C07d 51/36
U.S. Cl. 204—158               4 Claims

ABSTRACT OF THE DISCLOSURE 2,4,5 - trichloropyrimidine and 2,4,5,6-tetrachloropyrimidine are formed by the reaction of chlorine with a compound of the formula:

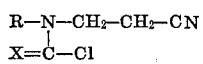

---

The object of the invention comprises processes for the production of 2,4,5-trichloropyrimidine and 2,4,5,6-tetrachloropyrimidine.

It has been found that 2,4,5-trichloropyrimidine and 2,4,5,6-tetrachloropyrimidine are obtained by reacting a 3-aminopropionitrile can be prepared by first adding meth-substituted 3-aminopropionitrile of the formula

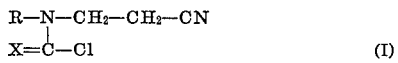     (I)

in which X is O or S, and R denotes a radical which can be split off under the conditions of the reaction, optionally in admixture with an inert diluent, at temperatures of 0 to 350° C., with an excess of chlorine, preferably under ultra-violet irradiation.

Suitable radicals R which can be split off under the conditions of the reaction are especially lower alkyl groups, such as, in particular, —CH$_3$, but also —C$_2$H$_5$.

Some of the starting compounds of the Formula I are known. Thus, for example, N-methyl-N-chlorocarbonyl-ylamine on to acrylonitrile to give 3-methylaminopropionitrile and this can subsequently be reacted with phosgene to give N-methyl-N-chlorocarbonyl - 3 - aminopropionitrile.

In general, the process is carried out by mixing a substituted 3-aminopropionitrile of the Formula I, preferably the N-methyl-N-chlorocarbonyl - 3 - aminopropionitrile, with a diluent and then introducing into this mixture an excess of gaseous chlorine. The reaction with chlorine is effected in the presence or absence of a catalyst. Especially satisfactory results are achieved when the chlorination is carried out under ultra-violet irradiation.

Diluents which are inert under the conditions of the reaction are all those solvents which are stable to chlorine, e.g. chlorinated aliphatic and aromatic hydrocarbons, such as chloroform, carbon tetrachloride, hexachlorocyclopentadiene, octachlorocyclopentene, 1,2,4 - trichlorobenzene, 1,1,2,3,3 - pentachloropropane and chlorinated pyrimidines. Chloroform is especially well suited as diluent.

The process is preferably carried out by first preparing, in a "one pot reaction," from a 3-alkylaminopropionitrile by a reaction with (thio)-phosgene in a diluent boiling below 100° C. the substituted 3-aminopropionitrile of the Formula I and further treating the latter directly with chlorine without isolating it. Thus, for example, it is possible to react first 3-methylaminopropionitrile, in admixture with preferably chloroform as diluent, with an excess of gaseous phosgene until the exothermal reaction has subsided and further phosgene is no longer taken up. An excess of gaseous chlorine is thereafter introduced into this reaction mixture, an irradiation with ultra-violet light being expedient for this purpose. In general, it is especially advantageous to heat the reaction mixture to the boiling point of the solvent or diluent, in the case where chloroform is used this means to about 60–65° C., and to continue the chlorination until further chlorine is no longer taken up. A higher boiling diluent may subsequently be added (boiling point, for example, between 100 and 300° C.) and the first diluent removed e.g. by distilling it off; alternatively, it is also possible to first retain the original solvent, especially chloroform, which is then distilled off in the further course of the chlorination. The reaction temperature is then slowly raised up to about 150 to 220° C., optionally with further ultra-violet irradiation, and the chlorination continued until the desired chloropyrimidines are obtained.

The ratio by volume between diluent and the 3-alkyl-aminopropionitrile initially used, especially the 3-methyl-aminopropionitrile, is preferably 1–10 parts by volume diluent per one part by volume 3-alkylaminopropionitrile. It is also possible to work without diluent, but the use of a diluent is generally preferred.

If the chlorination according to the invention is carried out in the presence of a chlorination catalyst, then iron-III-chloride may be used for the purpose.

The process according to the invention generally leads to mixtures of 2,4,5-trichloropyrimidine and 2,4,5,6-tetrachloropyrimidine. The degree of chlorination of the products obtained essentially depends upon the duration of the chlorination, the reaction temperature and upon the catalytic influence on the reaction, such as the ultra-violet irradiation. If the chlorination reaction is interrupted after the reaction temperature has risen to about 150 to 170° C., then 2,4,5-trichloropyrimidine is obtained as the main product. If the chlorination is carried out for a prolonged time, e.g. for 20 to 30 hours, at temperatures of 180 to 220° C., then 2,4,5,6-tetrachloropyrimidine is preponderantly obtained. On account of their different boiling points (2,4,5-trichloropyrimidine: B.P. 94–96° C./12 mm. Hg; 2,4,5,6 - tetrachloropyrimidine: B.P. 108–110° C./12 mm. Hg), the resultant chlorinated pyrimidines can readily be separated by distillation, for example with the aid of a column.

If mainly tetrachloropyrimidine is to be obtained as the end product, then it is possible to separate the lower chlorinated components, including 2,4,5-trichloropyrimidine, from the initially obtained mixture of chloropyrimidines and to use these components again for the chlorination reaction.

2,4,5-trichloropyrimidine is known and can be obtained, for example, according to Monatshefte 94, 1190 (1963) from 2,4 - dihydroxy-5-chloropyrimidine (obtained by chlorinating uracil in aqueous suspension) by the reaction with phosphorus oxychloride and dimethylaniline.

2,4,5,6-tetrachloropyrimidine is produced on a technical scale by the reaction of 5-chlorobarbituric acid with phosphorus oxychloride in the presence of dimethylaniline or diethylaniline (Swiss patent specification No. 373,045).

In comparison with these previously known processes, the new process according to the invention has the advantage that it can be carried out more economically since, on the one hand, when 2,4,5-trichloropyrimidine is prepared, the starting compounds of the Formula I and, on the other hand, the starting compound 2,4,5-trichloropyrimidine which, according to the invention, is used intermediately or isolated for the preparation of tetrachloropyrimidine, are extraordinarily readily obtainable, and the whole process is less expensive with regard to apparatus.

The chloropyrimidines produced according to the invention have fungicidal and sporicidal properties (cf. U.S. patent specification 2,227,612). Tetrachloropyrimidine is suitable as reactive component for the production of reactive dyestuffs (cf., e.g., Belgian patent specification No. 578,933).

EXAMPLE 1

Into a solution of N-methyl-N-chlorocarbonyl-3-aminopropionitrile in chloroform, which is obtained as described at the end of this example, and excess chlorine current is introduced at the reflux temperature of the chloroform (about 60° C). under ultra-violet irradiation until a further chlorine absorption does no longer occur.

After stopping the water cooling of the reflux condenser, the chloroform is first distilled off and the temperature is subsequently further increased by about 5 to 15° C. per hour up to 150 to 170° C. while further introducing an excess of chlorine. About 150 g. (40% of theory) 2,4,5-trichloropyrimidine are obtained by fractional distillation through a 1 metre-high column at B.P. 94–96° C./12 mm. Hg.

The solution of N-methyl-N-chlorocarbonyl-3-aminopropionitrile was obtained as follows:

168 g. (2.0 mol) 3-methylaminopropionitrile and 1 litre chloroform are placed into a three-neck flask of 2 litres capacity provided with thermometer, gas inlet tube, stirrer and reflux condenser. A dry phosgene current is passed through the gas inlet tube and the reaction flask is externally cooled with ice so that the reaction temperature is maintained at about between 25 and 40° C. When the exothermal reaction has subsided, the reaction mixture is further heated at 50 to 60° C., while further introducing phosgene, until the thickly liquid, white suspension formed in the course of the phosgenation, has been transformed into a water-clear liquid (about 2–3 hours after the start of the reaction).

EXAMPLE 2

The reaction mixture obtained according to Example 1 and preponderantly consisting of 2,4,5-trichloropyrimidine is further chlorinated directly, without isolation, for 24 to 30 hours at about 190–220° C. under intensive ultra-violet irradiation. About 185 g. (42% of theory) 2,4,5,6-tetrachloropyrimidine are obtained at B.P. 108–110° C./12 mm. Hg by fractional distillation through a 1 metre-high column.

We claim:

1. Process for the production of 2,4,5-trichloropyrimidine and 2,4,5,6-tetrachloropyrimidine which comprises reacting a compound of the formula

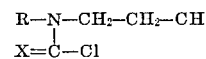

wherein X is O or S, and R represents a lower alkyl radical which can be split off under the reaction conditions, at a temperature of between about 0° C. and about 250° C., with an excess of chlorine in the presence of ultra-violet irradiation.

2. Process according to claim 1 which comprises reacting N-methyl-N-chlorocarbonyl-3-aminopropionitrile in the presence of an inert diluent, by introducing an excess of gaseous chlorine, at a temperature of from about 0° C. to about 250° C. and under ultra-violet irradiation, to give 2,4,5-trichloropyrimidine and 2,4,5,6-tetrachloropyrimidine.

3. Process for the production of 2,4,5,6-tetrachloropyrimidine which comprises treating 2,4,5-trichloropyrimidine at a temperature of from about 170° C. to about 240° C. under ultra-violet irradiation, with an excess of gaseous chlorine.

4. Process of claim 1 wherein R is methyl or ethyl.

References Cited

UNITED STATES PATENTS 3,365,452   1/1968   Weidinger et al. _____ 260—248

ALEX MAZEL, Primary Examiner

R. V. RUSH, Assistant Examiner

U.S. Cl. X.R.

260—251

UNITED STATES PATENT OFFICE
CERTIFICATE OF CORRECTION

Patent No. 3,506,551          Dated April 14, 1970

Inventor(s) GUNTHER BECK ET AL.          Page 2

It is certified that error appears in the above-identified patent and that said Letters Patent are hereby corrected as shown below:

| COLUMN | LINE | ERROR |
| --- | --- | --- |
| 3 | 5 | "2,227,612" should read --- 3,227,612 ---. |
| 4 | Formula in Claim 1 | "-$CH_2$-$CH_2$-CH" should read --- -$CH_2$-$CH_2$-CN ---. |

SIGNED AND SEALED
OCT 6 - 1970

(SEAL)
Attest:

Edward M. Fletcher, Jr.
Attesting Officer

WILLIAM E. SCHUYLER, JR.
Commissioner of Patents